US008095370B2

(12) United States Patent
Foster

(10) Patent No.: US 8,095,370 B2
(45) Date of Patent: Jan. 10, 2012

(54) DUAL COMPRESSION VOICE RECORDATION NON-REPUDIATION SYSTEM

(75) Inventor: Mark J. Foster, Palo Alto, CA (US)

(73) Assignee: AgileTV Corporation, Menlo Park, CA (US)

( * ) Notice: Subject to any disclaimer, the term of this patent is extended or adjusted under 35 U.S.C. 154(b) by 1239 days.

(21) Appl. No.: 10/943,718

(22) Filed: Sep. 17, 2004

(65) Prior Publication Data

US 2005/0033581 A1 Feb. 10, 2005

Related U.S. Application Data

(63) Continuation-in-part of application No. 09/785,375, filed on Feb. 16, 2001, now Pat. No. 7,047,196.

(60) Provisional application No. 60/504,171, filed on Sep. 18, 2003.

(51) Int. Cl.
G10L 21/00 (2006.01)
H04N 7/14 (2006.01)

(52) U.S. Cl. ..................... 704/275; 348/14.05
(58) Field of Classification Search .................. 704/275
See application file for complete search history.

(56) References Cited

U.S. PATENT DOCUMENTS

| | | |
|---|---|---|
| 4,445,215 A | 4/1984 | Svendsen |
| 4,506,387 A | 3/1985 | Walter |
| RE32,012 E | 10/1985 | Pirz et al. |
| 4,557,550 A | 12/1985 | Beals et al. |
| 4,633,499 A | 12/1986 | Nishioka et al. |

(Continued)

FOREIGN PATENT DOCUMENTS

EP 0576711 5/1994

(Continued)

OTHER PUBLICATIONS

Buffam, Non-Repudiation (Was: A biometric tangent . . . ), e-mail, May 8, 1998, <http://legalminds.lp.findlaw.com/list/e-carm/msg01096.html>, p. 1-2.*

(Continued)

*Primary Examiner* — Richemond Dorvil
*Assistant Examiner* — Olujimi Adesanya
(74) *Attorney, Agent, or Firm* — Michael A. Glenn; Glenn Patent Group

(57) ABSTRACT

A dual compression voice recordation non-repudiation system provides a voice recognition system that compresses voice samples for two purposes: voice recognition and human communication. The user navigates through menus displayed to a user through a television set using both voice commands and button presses on a remote control. The invention accepts voice samples from the remote control and compresses the voice sample for voice recognition while a copy of the voice sample is stored on a storage device. Compressed voice samples are sent to a Voice Engine that performs voice recognition on the voice sample to verify if it is from an authorized user from the consumer's household and determines the action required. If the command is to form a contractual agreement or make a purchase, the Voice Engine determines the merchant server that is appropriate for the action and sends the action request to the server. The voice sample is compressed for human communication and stored on a storage device along with any additional information. The stored human communication compressed sample and any additional information on the storage device may be later retrieved and the human communication compressed sample decompressed into a form that can be played back when a user attempts to repudiate a contractual agreement or purchase. Alternatively, the invention performs both compressions at the same time.

6 Claims, 5 Drawing Sheets

U.S. PATENT DOCUMENTS

| | | | |
|---|---|---|---|
| 4,653,045 A | 3/1987 | Stanley et al. | |
| 4,695,944 A | 9/1987 | Zandveld et al. | |
| 4,723,238 A | 2/1988 | Isreal et al. | |
| 4,728,169 A | 3/1988 | Campbell et al. | |
| 4,741,585 A | 5/1988 | Uken | |
| 4,747,652 A | 5/1988 | Campbell et al. | |
| 4,757,541 A | 7/1988 | Beadles | |
| 4,768,854 A | 9/1988 | Campbell et al. | |
| 4,780,906 A | 10/1988 | Rajasekaran et al. | |
| 4,783,809 A | 11/1988 | Glinski | |
| 4,790,617 A | 12/1988 | Campbell et al. | |
| 4,797,910 A | 1/1989 | Daudelin | |
| 4,815,805 A | 3/1989 | Levinson et al. | |
| 4,815,817 A | 3/1989 | Levinson | |
| 4,821,027 A | 4/1989 | Mallory et al. | |
| 4,821,265 A | 4/1989 | Albal et al. | |
| 4,822,125 A | 4/1989 | Beals et al. | |
| 4,824,199 A | 4/1989 | Uken | |
| 4,827,520 A | 5/1989 | Zeinstra | |
| 4,834,482 A | 5/1989 | Campbell et al. | |
| 4,837,830 A | 6/1989 | Wrench et al. | |
| 4,847,885 A | 7/1989 | Vittorelli | |
| 4,866,778 A | 9/1989 | Baker | |
| 4,889,403 A | 12/1989 | Zucker et al. | |
| 4,903,258 A | 2/1990 | Kuhlmann et al. | |
| 4,907,079 A | 3/1990 | Turner et al. | |
| 4,907,225 A | 3/1990 | Gulick et al. | |
| 4,931,950 A | 6/1990 | Isle et al. | |
| 4,939,728 A | 7/1990 | Markkula, Jr. et al. | |
| 4,949,338 A | 8/1990 | Albal et al. | |
| 4,955,018 A | 9/1990 | Twitty et al. | |
| 4,959,855 A | 9/1990 | Daudelin | |
| 4,962,497 A | 10/1990 | Ferenc et al. | |
| 4,972,485 A | 11/1990 | Dautrich et al. | |
| 4,981,334 A | 1/1991 | Sniadower | |
| 4,983,008 A | 1/1991 | Campbell et al. | |
| 4,984,237 A | 1/1991 | Franaszek | |
| 4,991,217 A | 2/1991 | Garrett et al. | |
| 4,993,017 A | 2/1991 | Bachinger et al. | |
| 5,001,711 A | 3/1991 | Obana et al. | |
| 5,006,987 A | 4/1991 | Harless | |
| 5,007,013 A | 4/1991 | Elms | |
| 5,029,962 A | 7/1991 | Uken et al. | |
| 5,037,170 A | 8/1991 | Uken et al. | |
| 5,080,506 A | 1/1992 | Campbell et al. | |
| 5,093,827 A | 3/1992 | Franklin et al. | |
| 5,124,978 A | 6/1992 | Chao | |
| 5,125,024 A | 6/1992 | Gokcen et al. | |
| 5,127,003 A | 6/1992 | Doll, Jr. et al. | |
| 5,130,984 A | 7/1992 | Cisneros | |
| 5,155,760 A | 10/1992 | Johnson et al. | |
| 5,157,654 A | 10/1992 | Cisneros | |
| 5,163,083 A | 11/1992 | Dowden et al. | |
| 5,165,095 A | 11/1992 | Borcherding | |
| 5,181,237 A | 1/1993 | Dowden et al. | |
| 5,193,132 A | 3/1993 | Uken et al. | |
| 5,197,005 A | 3/1993 | Shwartz et al. | |
| 5,199,062 A | 3/1993 | Von Meister et al. | |
| 5,208,848 A | 5/1993 | Pula | |
| 5,210,754 A | 5/1993 | Takahashi et al. | |
| 5,220,657 A | 6/1993 | Bly et al. | |
| 5,223,968 A | 6/1993 | Stringer et al. | |
| 5,225,902 A | 7/1993 | McMullan, Jr. | |
| 5,231,670 A | 7/1993 | Goldhar et al. | |
| 5,247,347 A | 9/1993 | Litteral et al. | |
| 5,255,305 A | 10/1993 | Sattar | |
| 5,271,088 A | 12/1993 | Bahler | |
| 5,274,560 A | 12/1993 | LaRue | |
| 5,315,304 A | 5/1994 | Ghaleb et al. | |
| 5,321,400 A | 6/1994 | Sasaki et al. | |
| 5,323,064 A | 6/1994 | Bacon et al. | |
| 5,325,421 A | 6/1994 | Hou et al. | |
| 5,329,608 A | 7/1994 | Bocchieri et al. | |
| 5,333,237 A | 7/1994 | Stefanopoulos et al. | |
| 5,333,320 A | 7/1994 | Seki | |
| 5,335,276 A | 8/1994 | Thompson et al. | |
| 5,345,538 A | 9/1994 | Narayannan et al. | |
| 5,349,678 A | 9/1994 | Morris et al. | |
| 5,353,336 A | 10/1994 | Hou et al. | |
| 5,369,575 A | 11/1994 | Lamberti et al. | |
| 5,386,556 A | 1/1995 | Hedin et al. | |
| 5,408,609 A | 4/1995 | Malgogne et al. | |
| 5,420,552 A | 5/1995 | Sakka | |
| 5,434,777 A | 7/1995 | Luciw | |
| 5,442,749 A | 8/1995 | Northcutt et al. | |
| 5,446,489 A | 8/1995 | Egendorf | |
| 5,475,792 A | 12/1995 | Stanford et al. | |
| 5,500,920 A | 3/1996 | Kupiec | |
| 5,513,298 A | 4/1996 | Stanford et al. | |
| 5,519,608 A | 5/1996 | Kupiec | |
| 5,526,034 A | 6/1996 | Hoarty et al. | |
| 5,546,119 A | 8/1996 | Bestler et al. | |
| 5,546,596 A | 8/1996 | Geist | |
| 5,550,578 A | 8/1996 | Hoarty et al. | |
| 5,553,119 A | 9/1996 | McAllister et al. | |
| 5,564,001 A | 10/1996 | Lewis | |
| 5,566,271 A | 10/1996 | Tomitsuka et al. | |
| 5,581,555 A | 12/1996 | Dubberly et al. | |
| 5,585,858 A | 12/1996 | Harper et al. | |
| 5,590,345 A | 12/1996 | Barker et al. | |
| 5,590,356 A | 12/1996 | Gilbert | |
| 5,602,963 A | 2/1997 | Bissonnette et al. | |
| 5,604,739 A | 2/1997 | Buhrgard et al. | |
| 5,608,448 A | 3/1997 | Smoral et al. | |
| 5,608,624 A | 3/1997 | Luciw | |
| 5,613,191 A | 3/1997 | Hylton et al. | |
| 5,615,296 A | 3/1997 | Stanford et al. | |
| 5,625,814 A | 4/1997 | Luciw | |
| 5,630,061 A | 5/1997 | Richter et al. | |
| 5,630,162 A | 5/1997 | Wilkinson et al. | |
| 5,634,086 A | 5/1997 | Rtischev et al. | |
| 5,642,519 A | 6/1997 | Martin | |
| 5,648,969 A | 7/1997 | Pasternak et al. | |
| 5,661,005 A | 8/1997 | Shattil et al. | |
| 5,664,061 A | 9/1997 | Andreshal et al. | |
| 5,666,400 A | 9/1997 | McAllister et al. | |
| 5,668,929 A | 9/1997 | Foster, Jr. | |
| 5,669,008 A | 9/1997 | Galles et al. | |
| 5,671,225 A | 9/1997 | Hooper et al. | |
| 5,671,328 A | 9/1997 | Fitzpatrick et al. | |
| 5,682,539 A | 10/1997 | Conrad et al. | |
| 5,708,836 A | 1/1998 | Wilkinson et al. | |
| 5,710,935 A | 1/1998 | Barker et al. | |
| 5,717,943 A | 2/1998 | Barker et al. | |
| 5,719,860 A | 2/1998 | Maison et al. | |
| 5,719,921 A | 2/1998 | Vysotsky et al. | |
| 5,721,827 A | 2/1998 | Logan et al. | |
| 5,721,902 A | 2/1998 | Schultz | |
| 5,721,938 A | 2/1998 | Stuckey | |
| 5,726,984 A | 3/1998 | Kubler et al. | |
| 5,726,990 A | 3/1998 | Shimada et al. | |
| 5,729,659 A | 3/1998 | Potter | |
| 5,732,216 A | 3/1998 | Logan et al. | |
| 5,734,921 A | 3/1998 | Dapp et al. | |
| 5,737,495 A | 4/1998 | Adams et al. | |
| 5,742,762 A | 4/1998 | Scholl et al. | |
| 5,748,841 A | 5/1998 | Morin et al. | |
| 5,748,974 A | 5/1998 | Johnson | |
| 5,752,068 A | 5/1998 | Gilbert | |
| 5,752,232 A | 5/1998 | Basore et al. | |
| 5,752,246 A | 5/1998 | Rogers et al. | |
| 5,774,525 A * | 6/1998 | Kanevsky et al. | 379/88.02 |
| 5,774,841 A | 6/1998 | Salazar et al. | |
| 5,774,859 A * | 6/1998 | Houser et al. | 704/275 |
| 5,774,860 A | 6/1998 | Bayya et al. | |
| 5,777,571 A | 7/1998 | Chuang | |
| 5,793,770 A | 8/1998 | St. John et al. | |
| 5,794,050 A | 8/1998 | Dahlgren et al. | |
| 5,794,205 A | 8/1998 | Walters et al. | |
| 5,802,526 A | 9/1998 | Fawcett et al. | |
| 5,805,775 A | 9/1998 | Eberman et al. | |
| 5,809,471 A | 9/1998 | Brodsky | |
| 5,812,977 A | 9/1998 | Douglas | |
| 5,818,834 A | 10/1998 | Skierszkan | |
| 5,819,220 A | 10/1998 | Sarukkai et al. | |
| 5,819,225 A | 10/1998 | Eastwood et al. | |
| 5,821,508 A | 10/1998 | Willard | |

| | | | | | | |
|---|---|---|---|---|---|---|
| 5,822,727 | A | 10/1998 | Garberg et al. | 6,141,691 A | 10/2000 | Frink et al. |
| 5,826,267 | A | 10/1998 | McMillan | 6,145,001 A | 11/2000 | Scholl et al. |
| 5,832,063 | A | 11/1998 | Vysotsky et al. | 6,151,319 A | 11/2000 | Dommety et al. |
| 5,832,439 | A | 11/1998 | Cox, Jr. et al. | 6,161,149 A | 12/2000 | Achacoso et al. |
| 5,842,031 | A | 11/1998 | Barker et al. | 6,173,279 B1 | 1/2001 | Levin et al. |
| 5,842,034 | A | 11/1998 | Bolstad et al. | 6,181,334 B1 | 1/2001 | Freemen et al. |
| 5,844,888 | A | 12/1998 | Markkula, Jr. et al. | 6,182,052 B1 * | 1/2001 | Fulton et al. ..................... 705/26 |
| 5,855,002 | A | 12/1998 | Armstrong | 6,182,136 B1 | 1/2001 | Ramanathan et al. |
| 5,860,059 | A | 1/1999 | Aust et al. | 6,182,139 B1 | 1/2001 | Brendel |
| 5,864,810 | A | 1/1999 | Digalakis et al. | 6,184,808 B1 | 2/2001 | Nakamura |
| 5,864,815 | A | 1/1999 | Rozak et al. | 6,185,619 B1 | 2/2001 | Joffe et al. |
| 5,864,819 | A | 1/1999 | De Armas et al. | 6,192,338 B1 | 2/2001 | Haszto et al. |
| 5,867,817 | A | 2/1999 | Catallo et al. | 6,192,340 B1 * | 2/2001 | Abecassis ..................... 704/270 |
| 5,870,134 | A | 2/1999 | Laubach et al. | 6,192,408 B1 | 2/2001 | Vahalia et al. |
| 5,874,939 | A | 2/1999 | Galvin | 6,198,822 B1 | 3/2001 | Doyle et al. |
| 5,882,168 | A | 3/1999 | Thompson et al. | 6,204,843 B1 | 3/2001 | Freeman et al. |
| 5,883,901 | A | 3/1999 | Chiu et al. | 6,205,582 B1 | 3/2001 | Hoarty |
| 5,884,265 | A | 3/1999 | Squitteri et al. | 6,208,650 B1 | 3/2001 | Hassell et al. |
| 5,885,083 | A | 3/1999 | Ferrell | 6,212,280 B1 | 4/2001 | Howard, Jr. et al. |
| 5,890,122 | A | 3/1999 | Van Kleeck et al. | 6,215,484 B1 | 4/2001 | Freemen et al. |
| 5,890,123 | A | 3/1999 | Brown et al. | 6,215,789 B1 | 4/2001 | Keenan et al. |
| 5,892,813 | A | 4/1999 | Morin et al. | 6,225,976 B1 | 5/2001 | Yates et al. |
| 5,893,063 | A | 4/1999 | Loats et al. | 6,320,947 B1 | 11/2001 | Joyce |
| 5,894,474 | A | 4/1999 | Maison et al. | 6,353,444 B1 * | 3/2002 | Katta et al. ..................... 715/716 |
| 5,898,827 | A | 4/1999 | Hornung et al. | 6,369,614 B1 | 4/2002 | Ridgway |
| 5,903,870 | A | 5/1999 | Kaufman | 6,370,499 B1 * | 4/2002 | Fujii ........................ 704/200.1 |
| 5,915,001 | A | 6/1999 | Uppaluru | 6,374,177 B1 | 4/2002 | Lee |
| 5,917,891 | A | 6/1999 | Will | 6,381,316 B2 | 4/2002 | Joyce |
| 5,920,841 | A | 7/1999 | Schottmuller et al. | 6,401,066 B1 * | 6/2002 | McIntosh ..................... 704/273 |
| 5,923,653 | A | 7/1999 | Denton | 6,445,717 B1 | 9/2002 | Gibson et al. |
| 5,923,738 | A | 7/1999 | Cardillo, IV et al. | 6,480,703 B1 | 11/2002 | Calderone et al. |
| 5,929,850 | A | 7/1999 | Broadwin et al. | 6,510,157 B2 | 1/2003 | Kwok et al. |
| 5,930,341 | A | 7/1999 | Cardillo, IV et al. | 6,523,061 B1 * | 2/2003 | Halverson et al. ............ 709/202 |
| 5,933,607 | A | 8/1999 | Tate et al. | 6,543,052 B1 * | 4/2003 | Ogasawara ..................... 725/60 |
| 5,933,835 | A | 8/1999 | Adams et al. | 6,570,913 B1 | 5/2003 | Chen |
| 5,937,041 | A | 8/1999 | Cardillo, IV et al. | 6,573,907 B1 | 6/2003 | Madrane |
| 5,944,779 | A | 8/1999 | Blum | 6,633,846 B1 | 10/2003 | Bennett et al. |
| 5,946,050 | A | 8/1999 | Wolff | 6,658,414 B2 | 12/2003 | Bryan |
| 5,953,700 | A | 9/1999 | Kanevsky et al. | 6,661,778 B1 | 12/2003 | Trofin et al. |
| 5,960,209 | A | 9/1999 | Blount | 6,668,292 B2 | 12/2003 | Meyer et al. |
| 5,960,399 | A | 9/1999 | Barclay et al. | 6,711,543 B2 | 3/2004 | Cameron |
| 5,963,557 | A | 10/1999 | Eng | 6,714,632 B2 | 3/2004 | Joyce et al. |
| 5,963,940 | A | 10/1999 | Liddy et al. | 6,721,633 B2 | 4/2004 | Funk |
| 5,966,528 | A | 10/1999 | Wilkinson et al. | 6,725,022 B1 | 4/2004 | Clayton |
| 5,970,457 | A | 10/1999 | Brant et al. | 6,728,531 B1 | 4/2004 | Lee |
| 5,970,473 | A * | 10/1999 | Gerszberg et al. ............... 705/26 | 6,742,021 B1 * | 5/2004 | Halverson et al. ............ 709/218 |
| 5,974,385 | A | 10/1999 | Ponting et al. | 6,750,792 B2 | 6/2004 | Azami et al. |
| 5,987,518 | A | 11/1999 | Gotwald | 6,785,653 B1 | 8/2004 | White et al. |
| 5,991,365 | A | 11/1999 | Pizano et al. | 6,799,201 B1 | 9/2004 | Lee |
| 5,991,719 | A | 11/1999 | Yazaki et al. | 6,889,191 B2 * | 5/2005 | Rodriguez et al. ............ 704/275 |
| 5,999,970 | A | 12/1999 | Krisbergh et al. | 6,892,083 B2 | 5/2005 | Shostak |
| 6,002,851 | A | 12/1999 | Basavaiah et al. | 6,895,379 B2 | 5/2005 | Smyers et al. |
| 6,003,072 | A | 12/1999 | Gerritsen et al. | 6,934,963 B1 * | 8/2005 | Reynolds et al. ................ 725/39 |
| 6,009,107 | A | 12/1999 | Arvidsson et al. | 7,013,283 B1 * | 3/2006 | Murdock et al. ............... 704/275 |
| 6,009,398 | A | 12/1999 | Mueller et al. | 7,047,196 B2 | 5/2006 | Calderone et al. |
| 6,009,470 | A | 12/1999 | Watkins | 7,113,981 B2 | 9/2006 | Slate |
| 6,012,030 | A | 1/2000 | French-St. George et al. | 7,233,898 B2 | 6/2007 | Byrnes et al. |
| 6,014,817 | A | 1/2000 | Thompson et al. | 7,260,538 B2 * | 8/2007 | Calderone et al. ............ 704/275 |
| 6,015,300 | A | 1/2000 | Schmidt, Jr. et al. | 7,471,786 B2 | 12/2008 | Erhart et al. |
| 6,018,711 | A | 1/2000 | French-St. George et al. | 2001/0007149 A1 * | 7/2001 | Smith ............................ 725/14 |
| 6,021,371 | A | 2/2000 | Fultz | 2001/0019604 A1 | 9/2001 | Joyce |
| 6,026,388 | A | 2/2000 | Liddy et al. | 2002/0012352 A1 | 1/2002 | Hansson et al. |
| 6,034,678 | A | 3/2000 | Hoarty et al. | 2002/0015480 A1 | 2/2002 | Daswani |
| 6,035,267 | A | 3/2000 | Watanabe et al. | 2002/0049535 A1 | 4/2002 | Rigo |
| 6,035,275 | A | 3/2000 | Brode et al. | 2002/0052746 A1 * | 5/2002 | Handelman ..................... 704/270 |
| 6,047,319 | A | 4/2000 | Olson | 2002/0103656 A1 * | 8/2002 | Bahler et al. ...................... 705/1 |
| 6,078,733 | A | 6/2000 | Osborne | 2002/0106065 A1 | 8/2002 | Joyce |
| 6,084,572 | A | 7/2000 | Yaniger et al. | 2002/0118676 A1 | 8/2002 | Tonnby et al. |
| 6,100,883 | A | 8/2000 | Hoarty | 2002/0146015 A1 | 10/2002 | Bryan |
| 6,108,565 | A | 8/2000 | Scherzer | 2002/0147579 A1 * | 10/2002 | Kushner et al. ................ 704/207 |
| 6,112,245 | A | 8/2000 | Araujo et al. | 2003/0023444 A1 * | 1/2003 | St. John ..................... 704/270.1 |
| 6,115,584 | A | 9/2000 | Tait et al. | 2003/0028380 A1 | 2/2003 | Freeland |
| 6,115,737 | A | 9/2000 | Ely et al. | 2003/0033152 A1 | 2/2003 | Cameron |
| 6,118,785 | A | 9/2000 | Araujo et al. | 2003/0046083 A1 * | 3/2003 | Devinney et al. ............ 704/273 |
| 6,119,162 | A | 9/2000 | Li et al. | 2003/0061039 A1 * | 3/2003 | Levin ............................ 704/246 |
| 6,122,362 | A | 9/2000 | Smith et al. | 2003/0065427 A1 | 4/2003 | Funk |
| 6,128,642 | A | 10/2000 | Doraswamy et al. | 2003/0068154 A1 | 4/2003 | Zylka |
| 6,137,777 | A | 10/2000 | Vaid et al. | 2003/0073434 A1 | 4/2003 | Shostak |
| 6,141,653 | A | 10/2000 | Conklin et al. | 2003/0167171 A1 * | 9/2003 | Calderone et al. ............ 704/270 |

| | | | |
|---|---|---|---|
| 2003/0187646 | A1 | 10/2003 | Smyers et al. |
| 2004/0064839 | A1* | 4/2004 | Watkins ..................... 725/131 |
| 2004/0077334 | A1 | 4/2004 | Joyce |
| 2004/0110472 | A1 | 6/2004 | Witkowski |
| 2004/0127241 | A1 | 7/2004 | Shostak |
| 2004/0132433 | A1 | 7/2004 | Stern |
| 2005/0143139 | A1 | 6/2005 | Park |
| 2005/0144251 | A1 | 6/2005 | Slate |
| 2005/0170863 | A1 | 8/2005 | Shostak |
| 2006/0018440 | A1 | 1/2006 | Watkins |
| 2006/0050686 | A1 | 3/2006 | Velez-Rivera |
| 2006/0085521 | A1 | 4/2006 | Sztybel |
| 2006/0206339 | A1 | 9/2006 | Silvera |
| 2006/0206340 | A1 | 9/2006 | Silvera |

FOREIGN PATENT DOCUMENTS

| | | | |
|---|---|---|---|
| EP | 0621713 | | 10/1994 |
| EP | 0 782 337 | | 7/1997 |
| EP | 0285330 | | 5/1998 |
| EP | 0895396 | | 2/1999 |
| EP | 1094406 | | 4/2001 |
| EP | 1122902 | A1 * | 8/2001 |
| EP | 1341363 | | 9/2003 |
| EP | 1003018 | | 5/2005 |
| EP | 1633150 | | 3/2006 |
| EP | 1633151 | | 3/2006 |
| EP | 1742437 | | 1/2007 |
| JP | 11-98022 | | 4/1999 |
| WO | 98/26595 | | 6/1998 |
| WO | 99/30501 | | 6/1999 |
| WO | WO 00/03542 | | 1/2000 |
| WO | WO00/16568 | | 3/2000 |
| WO | 00/24198 | | 4/2000 |
| WO | WO00/21232 | | 4/2000 |
| WO | WO01/22112 | | 3/2001 |
| WO | WO01/22249 | | 3/2001 |
| WO | WO01/22633 | | 3/2001 |
| WO | WO01/22712 | | 3/2001 |
| WO | WO01/22713 | | 3/2001 |
| WO | WO01/39178 | | 5/2001 |
| WO | WO01/57851 | | 8/2001 |
| WO | WO02/07050 | | 1/2002 |
| WO | WO02/11120 | | 2/2002 |
| WO | WO02/17090 | | 2/2002 |
| WO | WO 02/23900 | | 3/2002 |
| WO | WO02/097590 | | 12/2002 |
| WO | WO2004/021149 | | 3/2004 |
| WO | WO2004/077721 | | 9/2004 |
| WO | WO2005/079254 | | 9/2005 |
| WO | WO2006/029269 | | 3/2006 |
| WO | WO2006/033841 | | 3/2006 |
| WO | WO2006/098789 | | 9/2006 |

OTHER PUBLICATIONS

AMD Discloses New Technologies at Microprocessor Forum; Oct. 5, 1999; AMD—News Release #99105; http://www.amd.com/news/prodpr/99105.html; Printout from INSPEC, 7 pages.

Chien-Ping Chang, Ting-Yi Sung and Lih-Hsing Hsu, *Edge Congestion and Toplogical Properties of Crossed Cubes*, IEEE Transactions on Parallel and Distributed Systems, v11, n1, Jan. 2000, 17 pages.

Chu-Sun Yen, Richard C. Walker, Patrick T. Petruno; Cheryl Stout; Benny W.H. Lai; and William J. McFarland; *G-Link: A chipset for gigabit-rate data comumnication*; Hewlett-Packard Journal; Oct. 1992; printout from INSPEC, 18 pages.

Darrell Dunn; *API Revving Up Hypertransport Bus—Looks to raise interest in the technology via chip that links it to PCI*; EBN; Apr. 2, 2001; Print out from INSPEC, 3 pages.

Dave Polifko ; *The Optical Internet: Taking Up Where SONET Leaves Off*; Telecommunications; Jun. 2000; print out from INSPEC, 4 pages.

E-mail from Jim Jervis, client, to Michael Glenn, attorney, dated Thursday, Dec. 14, 2000, 9 pages.

Fu, et al.; "Cyclic-Cubes: A New Family of Interconnection Networks of Even Fixed-Degrees"; Dec. 1998; IEEE Transactions on Paralletl and Distributed Systems, vol. 9, No. 12, 16 pages.

Hasan Cam and Jose A.B. Fortes,"Work Efficient Routing Algorithms for Rearrangeable Symmetrical Networks", IEEE Transactions on Parallel and Distributed Systems, v10, n7, Jul. 1999, 9 pages.

Hwang, et al.; "Resource Scaling Effects on MPP Performance: the STAP Benchmark Implications"; May 1999; IEEE Transactions on Parallel and Distributed Systems, vol. 10, No. 5, 10 pages.

"HyperTransport; Technology Frequently Asked Questions"; undated; retrieved on Aug. 28, 2001 from website: http://www1.amd.com/products/cpg/showall/1,1395,,00.html?type=HyperTransport; Printout from INSPEC, 2 pages.

Jayant Matthew; "AMD Unveils Speedy Chip-to-Chip Link"; Electronic News; Feb. 19, 2001; Print out from INSPEC, 3 pages.

Jayant Matthew; "API NetWorks Introduces the First HyperTransport-to-PCI Bridge Chip"; Electronic News; Apr. 2, 2001; Print out from INSPEC, 2 pages.

Jerry Ascierto; "Rival post-PCI plans spark talk of bus war"; Electronic Engineering Times; 2001, n 1160, Apr. 2, 2001; print out from INSPEC, 4 pages.

Ken Popovich; "HyperTransport speeds data transfer" (Advanced Micro Devices Inc.); eWeek; Feb. 26, 2001; print out from INSPEC, 2 pages.

Ken Popovich; "Intel puts bus plan in gear—Chip maker challenges AMD's HyperTransport Architecture in bid to replace PCI in PC's, servers"; eWeek; Mar. 12, 2001; INSPEC printout, 2 pages.

Lacy, et al.; "The Offset Cube: A Three Dimensional Multicomputer Network Topology Using Throug-Wafter Optics"; Sep. 1998; IEEE Transactions on Parallel and Distributed Systems, vol. 9, No. 9, 16 pages.

Linley Gwennap; "AMD strikes Lightening"; Electronic Engineering Times; Feb. 19, 2001; printout from INSPEC, 2 pages.

Mark Miller; "Which route for routers?"; Buyer's Guide, As vendors relocate the function of routers, look for those devices to take on many new faces; Network World: Aug. 28, 1995; INSPEC printout, 2 pages.

Parhami, et al.; "Correction to 'Periodically Regular Chordal Rings'";Jul. 1999; IEEE Transactions on parallel and Distributed Systems, vol. 10, No. 7, 2 pages.

Parhami, et al.; "Periodically Regular Chordal Rings"; Jun. 1999;IEEE Transactions on parallel and Distributed Systems, vol. 10, No. 6, 15 pages.

Patterson, et al.; "Computer Oganization & Design: The Hardward/Software Interface"; 1998; Morgan Kaurmann Publishers, 2nd Ed., pp. 667-670.

Paulson, Linda Dailey; "New Bus Technology Boosts Performance"; Apr. 2001; News Briefs, pp. 23-24.

Pescovitz, David; "Monsters in a Box"; Dec. 2000; Wired, pp. 341-347.

Wyard, P.J., et al.; "Spoken Language Systems—Beyond Prompt Response"; 1996: BT Technology Journal; pp. 188-201.

Yuanyuan Yang, and Jianchao Wang, "Optimal All-to-All Personalized Exchange in Self-Routable Multistage Networks", IEEE Transactions on Parallel and Distributed Systems, v11, n3, Mar. 2000, pp. 261-274.

53 Page printout from: http://www.ai.sri.com CommandTalk, Mar. 10, 2000.

ACTV Awarded Three Key Digital Television Patents; Coverage Extended to ACTV's Core Technology for Eliminating Video Switching Delay; May 8, 2001; PRNewswire.

Amanda Stent, John Dowding, Jean Mark Gawron, eleizabeth Owen Bratt, and Robert Moore; The CommandTalk Spoken Dialogue System, In Proc. of the ACL, 1999.

Meyerson, Voice Recognition Still Selective, Jan. 15, 2000, Yahoo! News Alerts.

Ernail dated Jan. 15, 2001; Subject Fwd: Large Linux Cluster.

Email: Cray inc. Announces Plans for Alpha Linux Supercluster System; Feb. 12, 2001.

Email: Dec. 4, 2000; Fwd: Ars Technica: Inside the KLAT2 Supercomputer.

Email: Fwd: Re: One Voice Technologies; Feb. 15, 2001.

Hand out from SRI International; Simple Ui to Retrieve Favorites, 1999.

Info Wiz: An Animated Voice Interactive Information Sysem; http://www.ai.sri.com/~oaa/infowiz.html, Mar. 10, 2000.

Integrated Audio-Graphics User Interface., Apr. 1991, IBM Technical Disclosure Bulletin.

James Karney; A Sound Proposition Even Early on, There are Already Ways to Voice-enable a Site; Jan. 15, 2001; Internet World.

John Dowding, Elizabeth Owen Bratt and Sharon Goldwater; Interpreting Language in Context in CommandTalk; Feb. 5, 1999.

John Dowding, Jean Mark Gawron, Doug Appelt, John Bear, Lynn Cherny, Robert Moore, and Douglas Moran; Gemini: a Natural Language System for Spoken-Language Understanding, In Proc. of the 31st Annual ACL Conf, 1993.

John Dowding, Robert Moore, Francois Andry, and Douglas Moran; Interleaving Syntax and Semantics in an fficient Bottom-Up Parser, In Proc of the 32nd Annual ACL conf. 1994.

Printout: http://WWW.SPEECH.SRI.COM/DEMOS/ATIS.HTML, In working Notes, AAAI, Mar. 24-26, 1997.

Robert Moore, John Dowding, Harry Bratt, J. Mark Gawron, Yonael Gorfu, and Adam Cheyer; CommandTalk: A Spoken-Language Interface for Battlefield Simulations; Oct. 23, 1997.

Robert C. Bedichek; The Meerkat Multicomputer: Tradeoffs in Multicomputer Architecture; Dissertation Given and University of Washington, 1994.

Robert Moore, Douglas Appelt, John Dowding, J. Mark Gawron, and Douglas Moran; Combining Linguistic and Statistical Knowledge Sources in Natural-Language Processing for ATIS, In Proc. of the Jan. 1995 ARPA workshop, 1995.

Sarah Roberts-Witt; Talking to the Web; Jan. 15, 2001; Internet World.

Sprint Begins Voice-Activated E-Mail; May 23, 1001; Associated Press—New York Times, May 23, 2001.

Stephanie Miles, Will Microsoft's next OS run your TV?, Sep. 5, 2000, Yahoo! Daily News.

Where can I get an inVoca?, http://invoca.com/home/htm, Nov. 6, 2000

* cited by examiner

DUAL COMPRESSION VOICE RECORDATION NON-REPUDIATION SYSTEM

CROSS-REFERENCES TO RELATED APPLICATIONS

The present application is a continuation in-part of U.S. patent application Ser. No. 09/785,375 filed Feb. 16, 2001 now U.S. Pat. No. 7,047,196, and claims priority to U.S. Provisional Patent Application Ser. No. 60/504,171, filed Sep. 18, 2003, both of which are incorporated herein in their entirety by this reference thereto.

BACKGROUND OF THE INVENTION

1. Technical Field

The invention relates to voice recognition in a computer environment. More particularly, the invention relates to recording, compressing, and recognizing voice samples for non-repudiation purposes in a computer environment.

2. Description of the Prior Art

There is currently a push among set-top manufacturers to produce set-tops that extend beyond the television, video, and Internet realm. Television set-top boxes that deliver cable television signals to viewers are commonplace, as well as pay-per-view services for premium viewers.

WebTV has attempted to make headway into consumer's living rooms for many years, offering consumers the ability to surf the Internet through their television sets. America Online has announced an AOLTV which will provide the viewer with both cable television services, Digital Video Recorder features, and Internet access. UltimateTV has recently released a set-top box that tries to provide the same services as AOLTV.

Every one of these approaches require that a keyboard and mouse are connected to the set-top box in order to interact with the user interfaces. Commands, information, and URLs are entered using the keyboard, while the mouse is used to traverse clickable menus and hyperlinks.

One of the problems with the use of keyboards and mice is that they are cumbersome and require that the user be computer literate and have some semblance of manual dexterity. Computer-phobic and certain handicapped consumers typically stray away from these type of set-top boxes for those reasons.

Another problem, particularly in the pay-per-view arena, is that consumers will order a movie and, after the movie is viewed, will later call the provider and complain that they never ordered the movie and demand a refund. The pay-per-view provider loses a large amount of revenue when customers falsely repudiate their purchases. The provider typically has no alternative but to refund the customer's charge because there is no proof that it was in fact the customer that had ordered the movie in the first place.

A method of creating a verifiable trail that clearly identifies of the person that initiated and confirmed the purchase is needed. The use of voice recognition and commands to navigate through user interface menus, pay-per-view menus, ecommerce purchases, and the Internet has not been used in the set-top arena. The ability to demonstrate to the customer that he did make the purchase by playing, to the customer, a recording of his voice as he made the actual purchase would solve the problem of customers falsely or mistakenly repudiating purchases. This would allow the providers to reliably retain their revenue stream.

It would be advantageous to provide a dual compression voice recordation non-repudiation system that allows providers to reliably identify users through voice recognition and to use the user's voice for non-repudiation purposes. It would further be advantageous to provide a dual compression voice recordation non-repudiation system that performs compression techniques on voice samples for both voice recognition and human communication.

SUMMARY OF THE INVENTION

The invention provides a dual compression voice recordation non-repudiation system. The system allows providers to reliably identify users through voice recognition and to use the user's voice for non-repudiation purposes. In addition, the invention provides both voice recognition and human communication compression techniques for voice samples.

A preferred embodiment of the invention provides a voice recognition system that compresses voice samples for two purposes: voice recognition and human communication. Menus are displayed to a user through a television set or monitor. The user navigates through menu trees using both voice commands and button presses on a remote control.

The invention accepts voice samples from the remote control and compresses the voice sample for voice recognition. A copy of the voice sample is stored on a storage device.

Compressed voice samples are placed into packets and sent to a Voice Engine that performs voice recognition on the voice sample to determine if it is from an authorized user from the consumer's household. Once verified, the voice recognition sample is further processed to determine the action required.

If the command is to form a contractual agreement or make a purchase, the Voice Engine determines the merchant server that is appropriate for the action and sends the action request to the server. Once the action is performed, a transaction confirmation is displayed to the user. The voice sample is compressed for human communication and sent to the Voice Engine along with other information such as the last n utterance samples or the last n button presses.

The Voice Engine stores the human communication compressed sample on a storage device along with any additional information. The stored the human communication compressed sample and any additional information on the storage device may be later retrieved and the human communication compressed sample decompressed into a form that can be played back when a user attempts to repudiate a contractual agreement or purchase.

Alternatively, the invention can perform both compressions at the same time, thus bypassing the step of having to store the voice sample onto the storage device.

The user may be required to speak a challenge phrase or command phrase to complete an agreement or transaction. The Voice Engine then stores a copy of the human communication compressed sample of the challenge phrase or command phrase on the storage device for later retrieval for non-repudiation purposes.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a dual compression voice recordation non-repudiation system in a computer environment. A system according to the invention allows service providers and merchants to reliably identify users through voice recognition and to use the user's voice for non-repudiation purposes. In addition, the invention provides both voice recognition and human communication compression techniques for voice samples.

The invention provides a voice identification system that performs voice identification of a user and, upon verification, records the user's voice commands. Two types of voice compression are performed automatically, one for voice recognition and one for recording. The user's recorded voice is later used for non-repudiation contractual purposes when a user calls to cancel an order or challenge an option selection.

Figure 1:
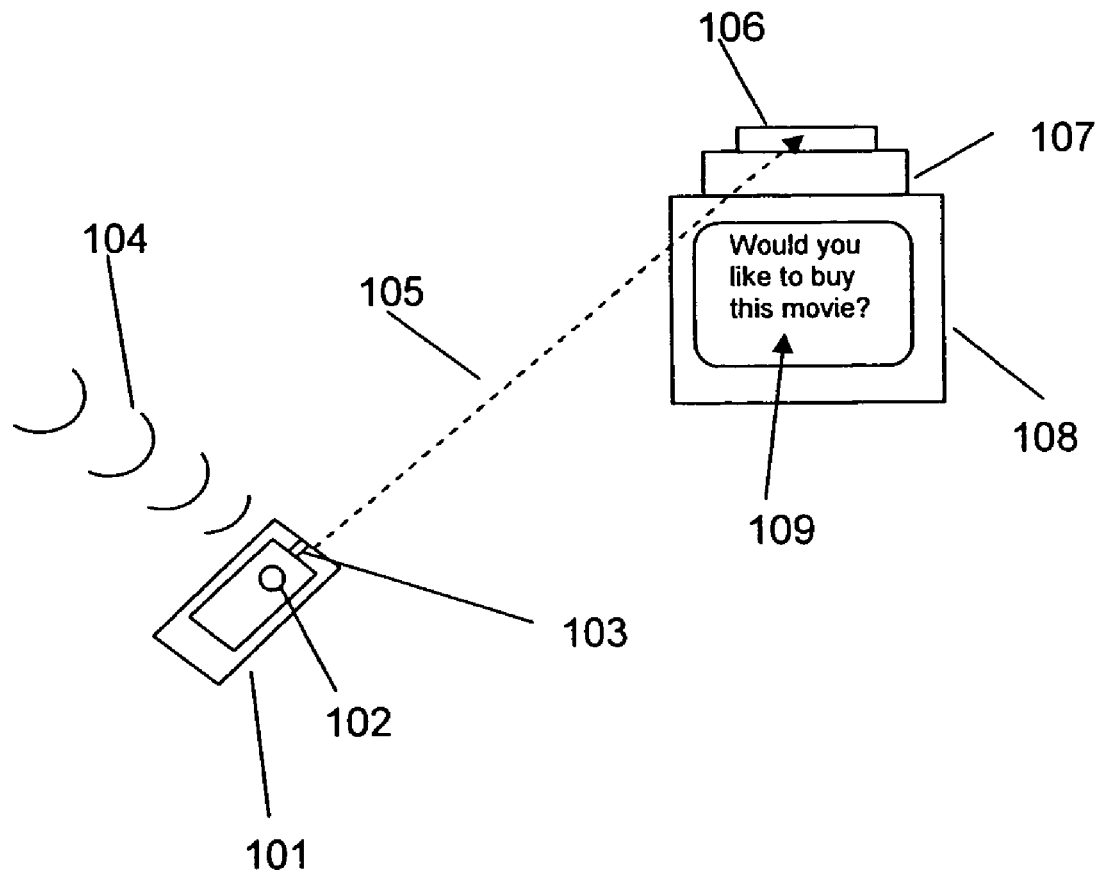
FIG. 1 is a block schematic diagram showing the interaction of a voice remote control and a preferred embodiment of the invention in conjunction with a set-top box according to the invention.

Referring to FIG. 1, a preferred embodiment of the invention provides a remote control 101 with a microphone 103 and a push to talk button 102. The user speaks 104 into the microphone 103 and the remote control 101 transmits voice commands and samples 105 via IR, RF, or other means, to a voice sampler 106 connected to or incorporated in a set-top box 107. The set-top box 107 is connected to a television set 108 where user interface menus and screens are displayed 109 to the user.

Figure 2:
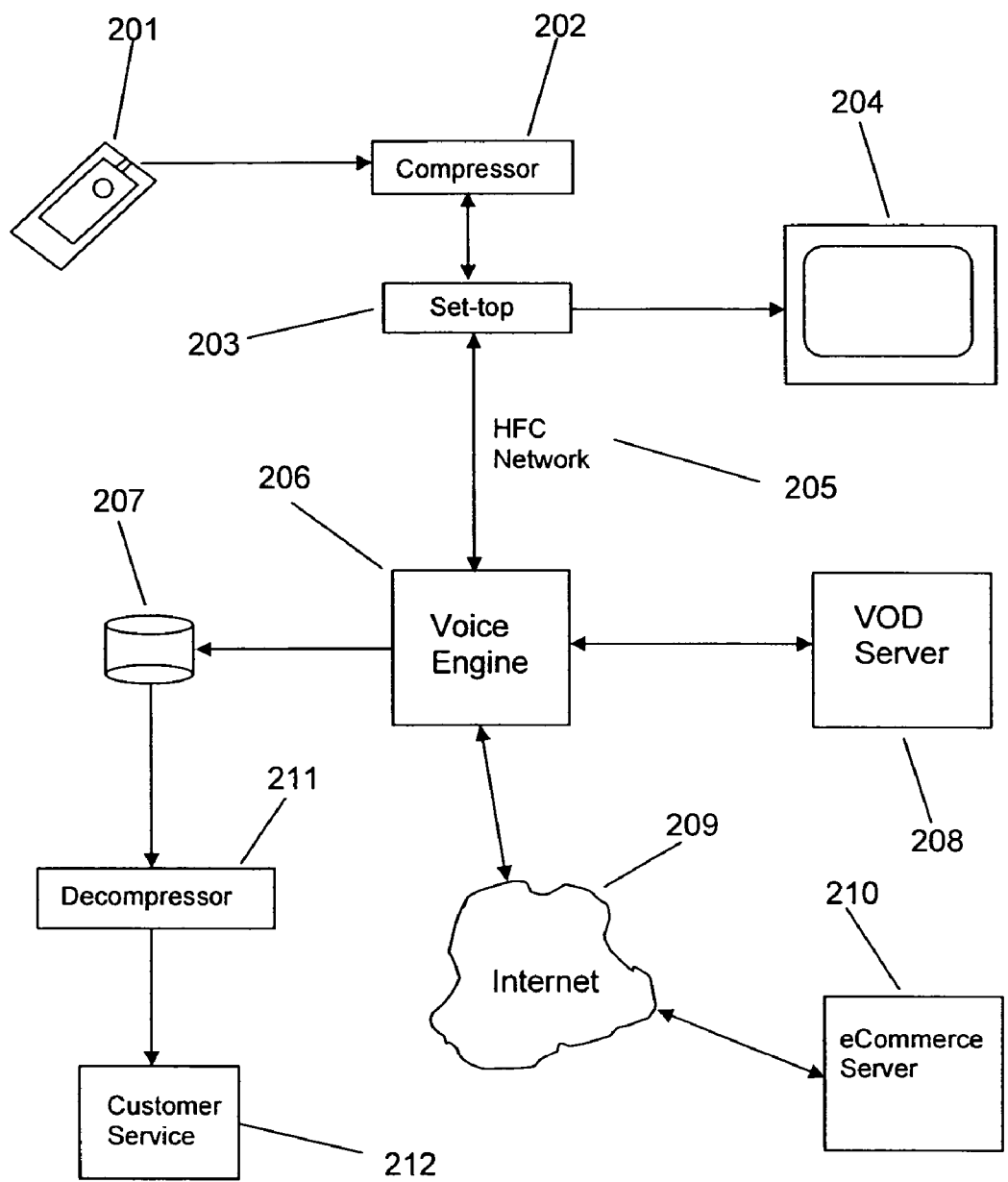
FIG. 2 is a block schematic diagram of a preferred embodiment of the invention showing the flow of information between components of the invention and other systems according to the invention.

With respect to FIG. 2, voice samples from the remote control 201 are sent to the voice sampler/compressor 202 which has a two-way serial connection to a set-top box 203. The set-top box 203 is connected to a television set 204 and a hybrid fiber coax (HFC) network 205. The HFC network 205 connects the set-top box with a voice engine 206. The voice samples are transmitted from the set-top box 203 through the HFC network 205 to the voice engine 206 that contains multiple processors.

The voice sampler/compressor 202 performs two different types of compression on audio samples. The incoming audio sample bit rate is very high quality e.g., 16 bits*16 kHz≈30 kilo bytes per second (kbs), while the upstream bit rate across the HFC network 205 is 4.8 kbs. This means that the samples being sent upstream across the HFC network 205 must be compressed aggressively. The invention compresses voice samples in two ways: for voice recognition (cepstrals); and for human communication. Compressing for voice recognition is not invertible, i.e., the compressed samples can be understood by the speech recognition system but are not intelligible by a human being. Compressing for human communication is used, for example, for playback purposes such as for non-repudiation of contracts.

Speech compression is well known in the art. The invention provides a system that performs voice recognition compression or voice compression for human communication on demand.

A preferred embodiment of the invention configures the voice sampler/compressor 202 to, by default, compress for voice recognition. When the voice sample comes down to the voice sampler/compressor 202, the voice sampler/compressor 202 saves a copy of the voice sample, compresses the voice sample for voice recognition, and sends the voice recognition compressed samples through the set-top box 203 to the voice engine 206. The voice engine 206 analyzes the voice sample to determine the user's identity. If the voice sample is from a valid user, then the sample is used to instruct the voice engine 206 to perform an action such as purchase an item or service.

The voice engine 206 then commands the appropriate vendor server 208, 210 to perform the requested action. Once the action is performed, the voice engine 206 requests a non-repudiation copy of the voice sample from the voice sampler/compressor 202. The voice sampler/compressor 202 retrieves the stored copy of the voice sample, compresses the voice sample for human communication, and sends the human communication compressed sample to the voice engine 206.

The voice engine 206 then stores the human communication compressed sample on a storage device 207, along with other pertinent data such as time stamps, previous button presses, etc. The stored human communication compressed sample can be later retrieved by, for example, a customer service representative 212 for use when the customer attempts to repudiate on a purchase. When the voice sample is needed, the customer service system 212 filters the stored sample through a decompressor 211. The decompressor 211 decompresses the human communication compressed voice sample to a form that can be played back to the customer.

As an example, a user says "buy Dumbo," into the remote control 201. The voice utterance is sent to the voice sampler/compressor 202. The voice sampler/compressor 202 stores a copy of the voice utterance, compresses the sample for voice recognition, and sends the voice recognition compressed sample to the voice engine 206.

The voice engine 206 identifies that the voice utterance is "buy Dumbo", the voice engine 206 tells the video on demand server 208 to purchase the movie Dumbo. The voice engine 206 then requests a non-repudiation sample from the voice sampler/compressor 202.

The voice sampler/compressor 202 retrieves the copy of the user's last n utterances and compresses the n utterances for human communication. The voice sampler/compressor 202 then sends the samples, compressed for human communication, to the voice engine 206. The voice engine 206 stores the samples compressed for human communication onto a non-volatile storage device 207. The sample can also be stored redundantly so the sample cannot be lost.

Later on, the user calls the provider's customer service 212 to complain that he did not purchase the movie Dumbo. The customer service 212 finds the record of the user's purchase on the storage device 207. Customer service 212 retrieves the compressed voice sample from the storage device 207. The compressed voice sample is sent to the decompressor 211 and the resulting voice sample is played back to the user to prove that he did indeed, order the movie Dumbo.

Another preferred embodiment of the invention allows the user to manipulate a series of menus on the television screen 204. When the user wants to purchase a service or product, he highlights a purchase button and selects it. The system then asks the user to say specific challenge phrase into the remote control 201, e.g., "I want to buy this Acme dishwasher" or "I confirm the purchase of this Acme dishwasher," to confirm the action.

The voice sample is saved and compressed by the voice sampler/compressor 202 as described above. The voice sampler/compressor 202 receives the command, sends a voice recognition compressed sample to the voice engine 206. The voice engine 206 confirms that the challenge phrase is correct. Once the challenge phrase is identified, the voice engine 206 sends the purchase command to the appropriate vendor server, e.g., through the Internet 209 to a ecommerce vendor 210. The invention can also confirm that the identity of the voice is an authorized person.

The voice engine 206 requests a human communication compressed version of the voice sample from voice sampler/compressor 202. In response, the voice sampler/compressor 202 retrieves the stored voice sample, compresses it for human communication, and sends it to the voice engine 206. The voice engine 206 stores the voice sample on the non-volatile storage device 207 and sends the purchase confirmation to the user.

In yet another preferred embodiment of the invention, the voice sampler/compressor 202 simultaneously compresses the voice sample for both voice recognition and human communication. Both compressed samples are then sent to the voice engine 206. The voice engine 206 does not have to make a request for the human communication compressed sample later on.

Alternatively, the voice sampler/compressor 202 could instead perform both compressions, but store the human communication compressed sample while sending the voice recognition compressed sample to the voice engine 206. The voice sampler/compressor 202 does not have to store a copy of the original voice sample.

A further preferred embodiment of the invention requires the user to say something during each step of the purchase, e.g., "movies," "children's movies," "Dumbo," "buy Dumbo," thus logging the user's progression. Each time the user speaks and progresses deeper into a menu set up to the purchase point, the voice samples are stored by the voice engine for later proof of purchase in case the user repudiates the transaction.

Having a reliable, verifiable means to confirm customer identities allows even wider applications. For example, the privacy policies concerning the use of private information are very sensitive issues in the marketplace today. Consumers must opt-in or opt-out of certain privacy policies, depending on which country or state that they reside in. The invention is easily adaptable to recognize and store a consumer's response to opting in, neutral, or out of a privacy policy. The consumer can visit the Web site of a retailer, for example, read the Web site's privacy policy and then verbally respond to the options for opting in or out. The consumer's voice is later used as proof of the consumer's privacy choice.

Figure 3:
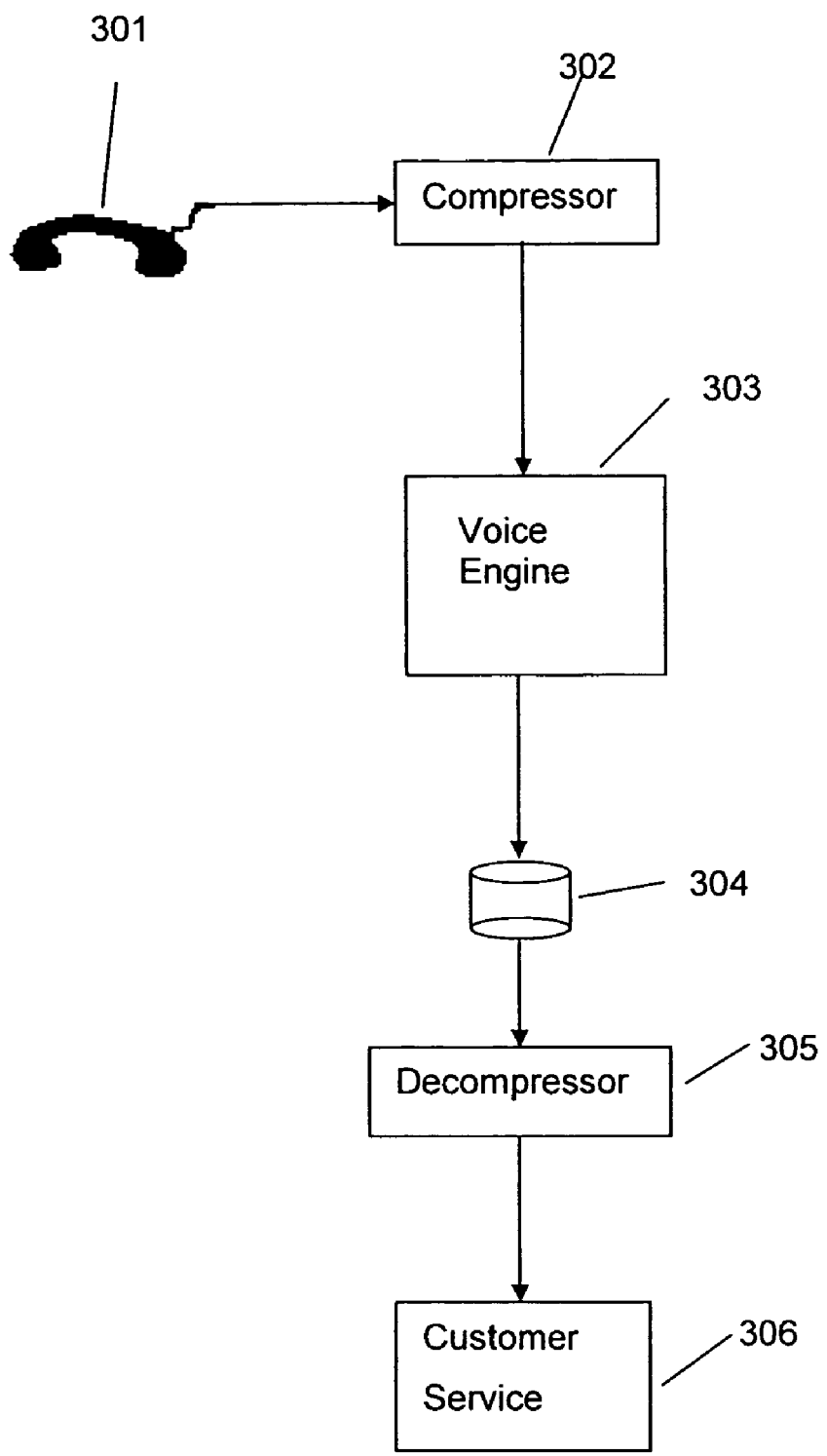
FIG. 3 is a block schematic diagram of a telephone based implementation of the invention according to the invention.

Referring to FIG. 3, one skilled in the art will readily appreciate that telephone based systems are also easily adaptable using the invention. The invention, for example, is easily adapted to take telephone opt-in or opt-out statements from a consumer and to store the voice samples as proof of the consumer's choice. The consumer speaks, telling the system what his selection is through the telephone 301. The voice sampler/compressor 302 sends the compressed voice sample to the voice engine. The voice engine 303 confirms that the consumer has selected one of the available options and stores the human communication compressed sample onto the storage device 304. If the customer service system 306 needs to prove that the consumer has made a certain selection, it will retrieve the voice sample from the storage device 304 and filter it through a decompressor 305 for play back to the consumer.

Figure 4:
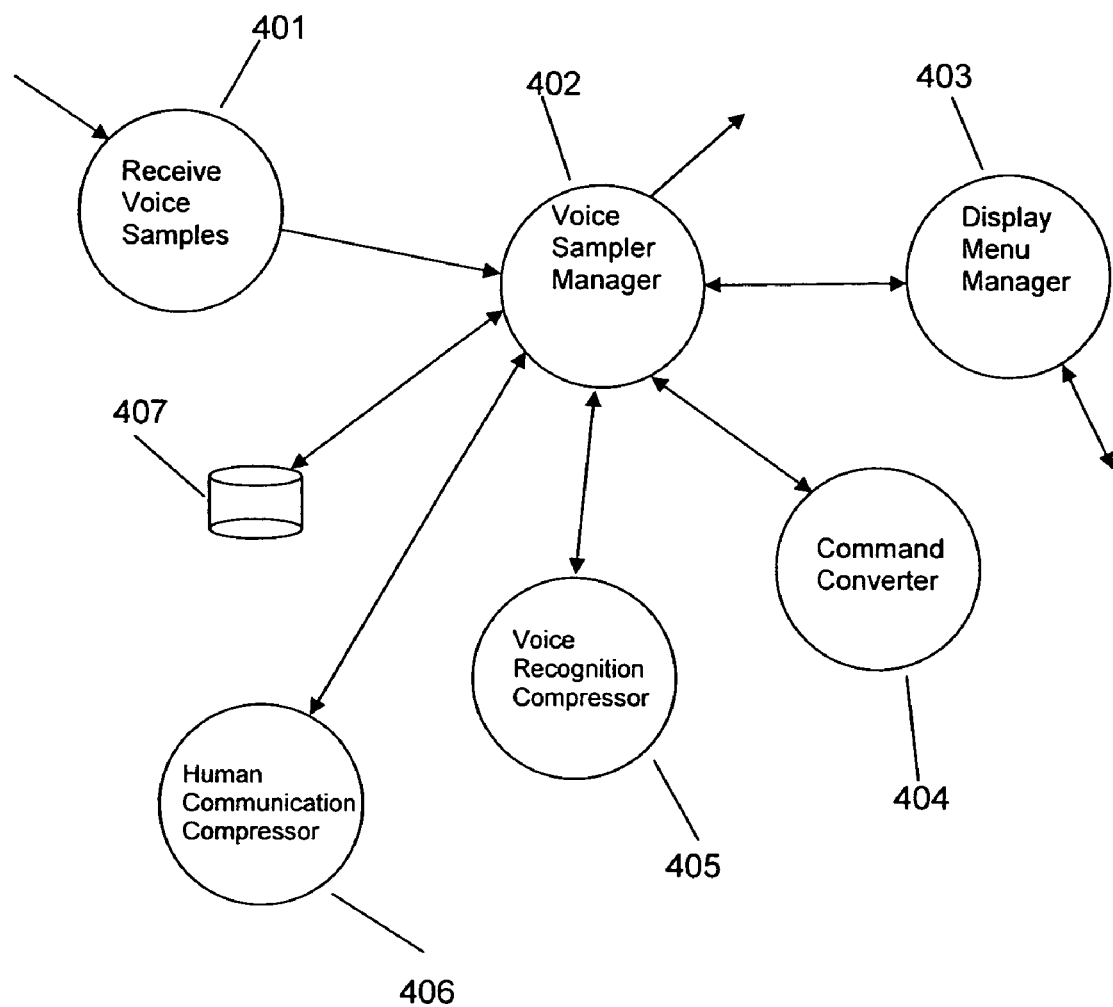
FIG. 4 is a block schematic diagram of a task-oriented viewpoint of a preferred embodiment of the invention illustrating the client system tasks according to the invention.
Figure 5:
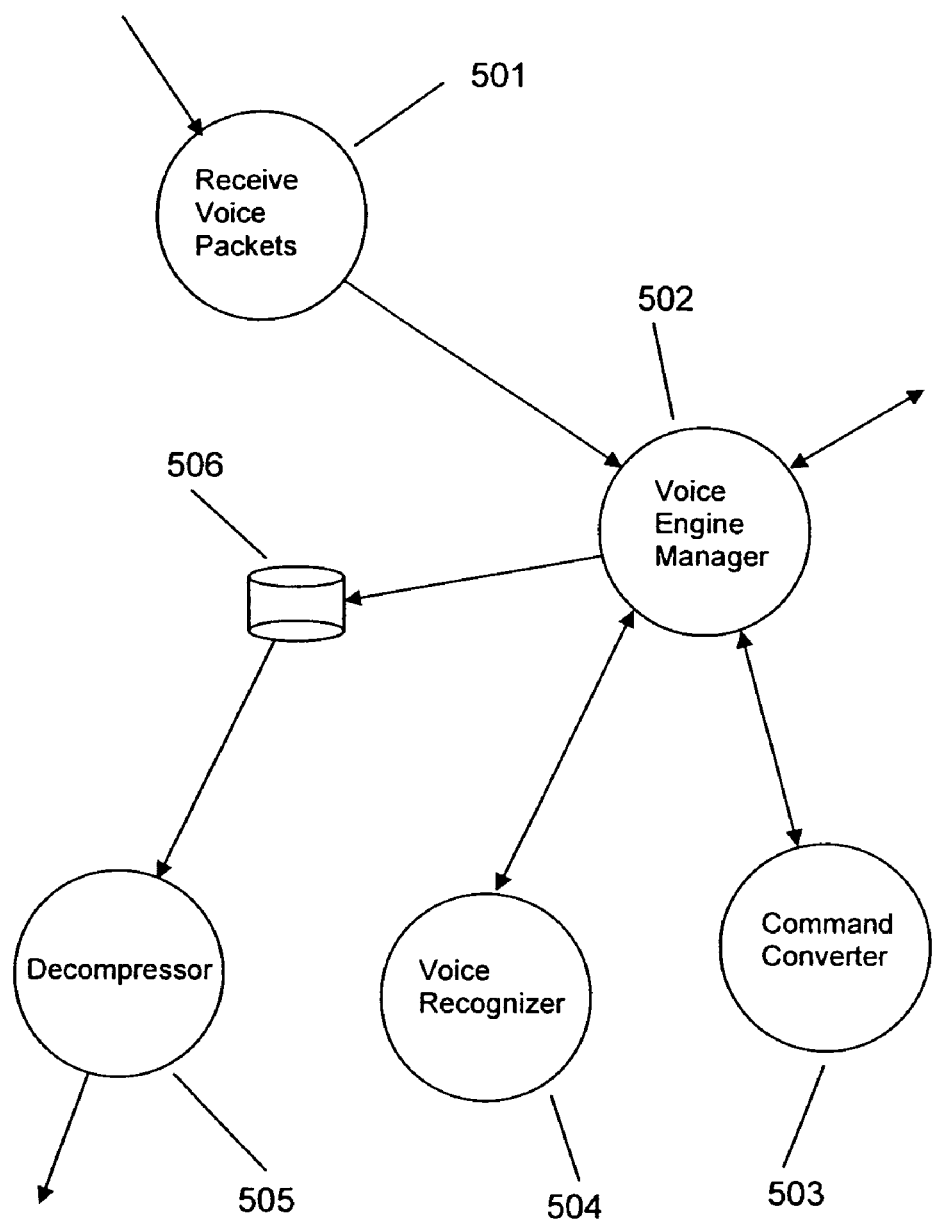
FIG. 5 is a block schematic diagram of a task-oriented viewpoint of a preferred embodiment of the invention illustrating the voice engine server tasks according to the invention.

With respect to FIGS. 4 and 5, a task viewpoint of the invention is shown. Voice samples from a remote control are received by the Receive Voice Samples module 401. The Voice Sampler Manager 402 receives the voice samples from the Receive Voice Samples module 401. When a sample is received, the Voice Sampler Manager 402 sends a copy to the Voice Recognition Compressor 405 which compresses the voice sample for voice recognition and sends the compressed sample back to the Voice Sampler Manager 402.

The Voice Sampler Manager 402 is aware of what menu is displayed through the Display Menu Manager 403. The Voice Sampler Manager 402 places the voice recognition compressed sample in a packet and sends it to the Receive Voice Packets module 501 and stores a copy of the voice sample on the storage device 407. Compressed voice samples are placed into packets by the Voice Sampler Manager 402 and may contain additional information to identify the user's location, ID number, merchant, last n button presses, etc.

The Receive Voice Packets module 501 receives voice packets and forwards them to the Voice Engine Manager 502. Voice recognition compressed samples are sent to the Voice Recognizer 504. The Voice Recognizer 504 determines if the voice sample is from an authorized user from the consumer's household. Once verified, the voice recognition sample is sent to the Command Converter 503 to determine the action required.

Menu navigation commands are sent by the Voice Engine Manager 502 to the Display Menu Manager 403 via the Voice Sampler Manager 402. The Display Menu Manager 403 displays the resulting menu provided by the Voice Engine Manager 502 or, alternatively, from its local menu tree.

If the command is to form a contractual agreement or make a purchase, the Voice Engine Manager 502 determines the merchant server that is appropriate for the action and sends the action request to the server. Once the action is performed, the Voice Engine Manager 502 sends the transaction confirmation and a request for the human communication compressed sample of the voice sample to the Voice Sampler Manager 402.

Transaction confirmations are displayed to the user through the Display Menu Manager 403. The Voice Sampler Manager 402 retrieves the voice sample and possibly the last n utterance samples from the storage device 407 and sends it to the Human Communication Compressor 406. Samples are compressed for human communication by the Human Communication Compressor 406 and assembled into packets (which may also contain additional information such as the last n button presses) and sent to the Receive Voice Packet module 501 by the Voice Sampler Manager 402.

Voice packets are forwarded by the Receive Voice Packets module 501 to the Voice Engine Manager 502. The Voice Engine Manager 502 stores the human communication compressed sample on the storage device 506 along with any additional information (such as the last n button presses).

The stored the human communication compressed sample and any additional information on the storage device 506 may be later retrieved by the Decompressor 505 for decompressing the human communication compressed sample into a form that can be played back As noted above, the Voice Sampler Manager 402 can perform both compressions at the same time, thus bypassing the step of having to store the voice sample onto the storage device 407. In that case, both compressed samples are sent to the Receive Voice Packets module 501 without the Voice Engine Manager 502 requesting the human communication compressed sample.

Alternatively, the Voice Sampler Manager 402 is aware of what menu is displayed through the Display Menu Manager 403. If a command is expected, the Voice Sampler Manager 402 sends the voice recognition compressed sample to the Command Converter 404 to check if a valid command has been spoken. Valid commands are then executed through the Display Menu Manager 403.

If a challenge phrase or command phrase (e.g., "buy Dumbo") is expected, then the Voice Sampler Manager 402 places the voice recognition compressed sample in a packet and sends it to the Receive Voice Packets module 501 and stores a copy of the voice sample on the storage device 407.

If the user is traversing a menu tree that leads to a purchase, for example, the Voice Sampler Manager 402 can save the voice sample on the storage device 407 for later retrieval and will continue through the menu tree.

One skilled in the art will readily appreciate that although the voice sampler/compressor and voice engine functionalities are described separately above, both the voice sampler/compressor and voice engine can reside on the same physical machine.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

The invention claimed is:

1. A process for a dual-compression voice recognition system for non-repudiation of contractual agreements in a computer environment, comprising the steps of:
providing a video content head-end voice processing engine configured for receiving requests to navigate through available content and for purchasing content products from an on-line merchant by identifying the content in a natural language and speaking a challenge phrase;
providing user interface means for displaying a plurality of menus on a television screen to said user;
receiving a voice sample from a user indicating an action and speaking said challenge phrase into a voice sample reception means;
concurrently compressing said voice sample in two ways, comprising both:
compressing said voice sample according to a first compression technique to yield an Automatic Speech Recognition (ASR) compression, wherein ASR compression is configured for processing by an automatic speech recognition engine, wherein said first compression technique involves using a cepstrum to minimize bandwidth, wherein a cepstral compression is noninvertible; and
compressing said voice sample according to a second compression technique to yield a human communication compression, wherein said human communication compression is formed using an invertible compression process;
transmitting both said ASR compression and said human communication compression through a set-top box and across a hybrid fiber coax network to said head-end voice processing engine, and wherein said head-end voice processing engine is configured for performing the steps of:
analyzing said ASR compression to determine if said ASR compression is from an authorized user;
correlating said ASR compression with an interface navigation command and a request to make a purchase of content via said plurality of menus;
executing said interface navigation command, thereby causing said user interface means to navigate to a menu containing an option to purchase user-specified content on said television screen to said user;
executing said request to make a purchase of user-specified content;
sending said request to make a purchase of user-specified content to an appropriate merchant server;
delivering said user-specified content to said user;
receiving a repudiation request from said user alleging that said user did not request to make a purchase of said user-specified content;
decompressing said human communication compression for playback; and
playing back said decompressed challenge phrase to said user, thereby confirming the identity of said user as a provider of said request to make a purchase of user-specified content challenge phrase and avoiding repudiation of said request to make a purchase by said user.

2. The process of claim 1, wherein said user interface means displays a confirmation of said action upon completion of said action.

3. The process of claim 1, further comprising the step of:
storing additional information with said decompressing said human communication compression that comprises any of said user's location, ID number, merchant, the last predetermined number of utterances, and the last predetermined number of button presses.

4. An apparatus for a dual-compression voice recognition system for non-repudiation of contractual agreements in a computer environment, comprising:
a video content head-end voice processing engine configured for receiving requests to navigate through available content and for purchasing content products from an on-line merchant by identifying the content in a natural language and speaking a challenge phrase;
a graphical user interface (GUI) for displaying a plurality of menus on a television screen to a user;
voice sample reception means for receiving a plurality of voice samples from said user, wherein at least some of said voice sample indicate action and speaking said challenge phrase;
a module for concurrently compressing at least one voice sample for voice recognition in two ways, said module comprising both:
a first processing means for compressing said voice sample according to a first compression technique to yield an Automatic Speech Recognition (ASR) compression, wherein ASR compression is configured for processing by an automatic speech recognition engine, wherein said first compression technique involves voice recognition using a cepstrum to minimize bandwidth, wherein a cepstral compression is noninvertible; and
compressing said voice sample according to a second compression technique to yield a human communication compression, wherein said human communication compression is formed using an invertible compression process;
a set-top box for transmitting both said ASR compression and said human communication compression over a hybrid fiber coax network to a head-end voice engine, wherein said head-end voice engine further comprises;

a module for analyzing said ASR compression to determine if said ASR compression is from an authorized user;

a module for correlating said ASR compression with an interface navigation command and a request to make a purchase of content via said plurality of menus;

a module for executing said interface navigation command, thereby causing said user interface means to navigate to a menu containing an option to purchase user-specified content on said television screen to said user;

a module for executing said request to make a purchase of user-specified content;

a module for sending said request to make a purchase of user-specified content to an appropriate merchant server;

a module for delivering said user-specified content to said user;

a module for receiving a repudiation request from said user alleging that said user did not request to make a purchase of said user-specified content;

a module for decompressing said human communication compression a module for playing back said decompressed playback sample to said user, thereby confirming the identity of said user as a provider of said request to make a purchase of user-specified content and challenge phrase or said command phrase.

5. The apparatus of claim 4, wherein said user interface means displays a confirmation of said action upon completion of said action.

6. The apparatus of claim 5, wherein said compressed human communication sample storing module stores additional information with said decompressing said human communication compression that comprises any of said user's location, ID number, merchant, the last predetermined number of utterances, and the last predetermined number of button presses.

* * * * *